United States Patent [19]

Rohrbach et al.

[11] Patent Number: 5,286,767
[45] Date of Patent: Feb. 15, 1994

[54] MODIFIED AGAR AND PROCESS FOR PREPARING MODIFIED AGAR FOR USE CERAMIC COMPOSITION TO ADD GREEN STRENGTH AND/OR IMPROVE OTHER PROPERTIES OF A PREFORM

[75] Inventors: Ronald P. Rohrbach, Flemington, N.J.; Julie R. Schollmeyer, Des Plaines, Ill.; Anthony J. Fanelli, Rockaway, N.J.

[73] Assignee: Allied Signal Inc., Morristown, N.J.

[21] Appl. No.: 676,646

[22] Filed: Mar. 28, 1991

[51] Int. Cl.$^5$ .................. C08L 5/12; B09C 39/00
[52] U.S. Cl. .................... 524/27; 524/55; 264/122
[58] Field of Search ............ 524/17, 22, 442, 27, 524/55; 252/315.2, 315.3

[56] References Cited

U.S. PATENT DOCUMENTS

| | | | |
|---|---|---|---|
| 3,878,895 | 4/1975 | Wieland et al. | 166/294 |
| 4,273,734 | 6/1981 | Seiderman | 524/17 |
| 4,442,175 | 4/1984 | Flannery et al. | 428/406 |
| 4,734,237 | 3/1988 | Fanelli | 264/122 |
| 4,826,643 | 5/1989 | Newkirk et al. | 264/57 |
| 5,034,448 | 7/1991 | Koblinski et al. | 524/447 |
| 5,047,181 | 9/1991 | Occhionero et al. | 264/28 |
| 5,089,343 | 2/1992 | Colborn et al. | 428/469 |

FOREIGN PATENT DOCUMENTS

| | | |
|---|---|---|
| 0246438 | 11/1987 | European Pat. Off. |
| 325425 | 7/1989 | European Pat. Off. |
| 63-0101902 | 4/1988 | Japan |
| 1275411 | 11/1989 | Japan |

OTHER PUBLICATIONS

Birnbaum, S., *Covalent Stabilization of Alginate Gel for the Entrapment of Living Whole Cells*, Biotechnology: Letters, vol. 2, No. 6, pp. 393–400 (1981).
"Hawley's Condensed Chemical Dictionary", eleventh edition, p. 959.

*Primary Examiner*—John Kight, III
*Assistant Examiner*—Jeffrey Culpeper Mullis
*Attorney, Agent, or Firm*—Ernest D. Buff; Gerhard H. Fuchs

[57] ABSTRACT

Novel gel-forming compositions are used in a process for molding ceramic compositions. Gel-forming compositions, such as agar, are improved with a gel-enhancing agent, e.g. polyethyleneimine. The novel gel-forming compositions improved the ceramic molding process and/or the ceramic products formed therefrom.

9 Claims, No Drawings

5,286,767

MODIFIED AGAR AND PROCESS FOR PREPARING MODIFIED AGAR FOR USE CERAMIC COMPOSITION TO ADD GREEN STRENGTH AND/OR IMPROVE OTHER PROPERTIES OF A PREFORM

FIELD OF THE INVENTION

This invention relates to a modified gel-forming material, e.g. agar, a process for preparing modified gel forming material and applications of the gel-forming material in processes for shaping metallic and ceramic parts from powders as well as the compositions and products produced by the above processes. The use of the gel-forming compositions in molding ceramic materials and metallic materials provides for high quality products which exhibit excellent green strength and can be fired without (or significantly reduced chances for) experiencing the cracking, distortion and shrinkage problems commonly associated with other sintered products.

BACKGROUND OF THE INVENTION

The production of sintered parts from "green" bodies is well known in the art. Generally, the green body is formed by filling a die with a powder/binder mixture and compacting the mixture under pressure to produce the green body. The green body, a self-supporting structure is then removed from the die and sintered. During the sintering process, the binder is volatilized and burned out. However, removal of the binder can cause the product to crack, shrink and/or become distorted.

The injection molding of parts from metallic and/or ceramic powders has been a particularly troublesome process. Suitable injection molding compositions must be those which are capable of transforming from a highly fluid state (necessary for the injection step to proceed) to a solid state having a high green strength (necessary for subsequent handling). In order to meet these requirements, the prior art molding compositions comprise a relatively high percentage of a low melting point binder, such as, wax. However, such systems exhibit a number of problems in forming parts, especially parts of complex shapes.

More specifically, waxes are commonly employed as binders because they fulfill the rheological requirements of high fluidity at moderately elevated temperatures and substantial rigidity at temperature below about 25° C. Wax formulations normally comprise between about 10% and about 20% wax by weight of the formula. During the firing process, wax is initially removed from the body in liquid form. During this initial step of the firing process, the green body may disintegrate or become distorted. Consequently, it is often necessary to preserve the shape of the green body by immersing it in an absorbent refractory powder (capable of absorbing the liquid wax). Notwithstanding the use of the supporting powder to retain the shape of the body, products produced from these systems ordinarily shrink and are relatively porous. Moreover, the formation of complex shapes from wax based systems is even more difficult because it requires, in most instances, detailed firing schedules which may encompass several days in an attempt to avoid the development of cracks in the part.

More recently, the use of methylcellulose polymers as binders in the manufacture of parts from metals or ceramic powders has been disclosed. Sarkar et al., in "Methylcellulose Polymers as Multi Functional Processing Aids in Ceramics", *Ceramics Bulletin,* Vol. 62, No. 11, pp. 1281-1288 (1983), disclose the extrusion of honeycombed ceramic structures employing methylcellulose and discuss the "gelation" of methylcellulose-containing solutions at elevated temperatures. In addition, U.S. Pat. No. 2,113,480 discloses the use of methylcellulose or other plastic media (e.g. polyvinyl alcohol) in forming injection molded metallic parts.

U.S. Pat. No. 4,734,237 to Fanelli et al., which is incorporated herein by reference, discloses a molding composition and process for shaping parts from metallic and/or ceramic powders wherein an agaroid gel-forming material is employed as the binder.

The agaroid containing compositions and molding processes employing them reduce the firing times and regimens for the parts prepared therefrom. The compositions also allow for the production of complex shapes without the attendant shrinkage and cracking problems associated with other molding compositions and products.

SUMMARY OF THE INVENTION

This invention relates to modified gel-forming compositions, processes for making the modified gel-forming composition, and molding compositions and processes employing said modified gel-forming compositions.

The modified gel-forming composition comprises a gel-forming material and gel-enhancing agent. These compositions may further comprise an oxidizing agent and/or solvent for the gel-forming material.

This invention is also directed to a molding composition which comprises a modified gel-forming composition and one or more powders selected from ceramic, metallic powders and mixtures of these powders.

Other embodiments of the invention are directed to forming a preform article from the molding compositions by the following steps:
  a) heating a mixture comprising
    1. a gel-forming material,
    2. a gel-enhancing agent,
    3. a gel-forming material solvent, and
    4. optionally, an oxidizing agent
  to a first temperature above the gel point of the modified gel-forming composition to solubilize the gel-forming material
  b) supplying the mixture to a mold;
  c) molding the mixture at a second temperature, cooler than said first temperature, at or below the gel point of the gel-forming material to produce a self-supporting article comprising the powders and a gel.

This invention is also directed to injection molding process for forming a preform article composition comprising the following steps:
  a) injecting a mixture comprising:
    1. a gel-forming material,
    2. a gel-enhancing agent,
    3. a gel-forming material solvent,
    4. one or more powders selected from metal or ceramic powders or a mixture thereof.
    5. a carrier, and
    6. optionally, an oxidizing agent
  into a mold, the mixture being maintained prior to the injection step at a first temperature above the gel point of the gel-forming material;

b) cooling the mixture in the mold, to a second temperature below the gel point of the gel-forming material to form a self-supporting article comprising the powders, a gel composition which comprises the gel-forming material and a gel enhancing agent.

The preform article (or "green body") is then fired or sintered to produce a ceramic and/or metal part. The ceramic and/or metal parts or compositions can be formed with significantly reduced firing times. The preform, when fired or sintered, should undergo minimal shrinkage and/or cracking.

DETAILED DESCRIPTION OF THE INVENTION

One aspect of the invention relates to a modified gel composition comprising a gel-forming material and a gel-enhancing agent. The gel-forming material used in the practice of the invention can be any conventional gelling material. Illustrative of gel-forming materials are the natural gums or synthetic gums, which include polysaccharides, proteins and synthetic polymers. In a preferred embodiment of the invention, the gel-forming material is agar. Agar is commercially available and its uses include preparation of food gels and/or solid culture media for culturing microorganisms. In general, agar contains a fraction which has excellent gelling ability and another fraction having less gelling ability which is referred to as agaropectin. The non-gelling portion is characterized as having sulphonated groups therein. Although recent studies have discovered that agar contains a spectrum of molecules and/or fractions that have similar but continuously varying chemical structure, for our purposes, we will refer to the general description of agar.

The gelling properties of agar can be significantly improved by the addition of a gel-enhancing agent. The gel-enhancing agent is capable of reacting with the agar components through functional reactional groups or through electrostatic forces or through a combination of both. It is theorized that non-gelling portions of agar are cross-linked by the gel-enhancing agent. It is believed that electrostatic forces of the gel-enhancing agent interact with electrostatic forces of the gelling or non-gelling portions of agar, resulting in crosslinking of the agar. Since agar may possess a non-gelling portion containing sulphonated groups, the gel-enhancing agent may interact electrostatically with such groups, thereby causing crosslinking which increases the overall gel strength of the agar. As noted above, the gel-enhancing agent may simply react through functional groups to create the desired crosslinking. Generally, a gel-enhancing agent is a compound or polymer possessing a functional group and/or positive electrostatic charge sufficient to crosslink with agar. Preferably, the gel-enhancing agent is polymer. In more preferred embodiments, the gel-enhancing agent is a polymer comprising more than one repeating unit of a functional group and/or electrostatic group, either of said groups causing crosslinking of the agar. It is noted that a gel-enhancing agent with a flexible polymer chain is preferred to permit alignment of the polymer chain in various formations that will enable the atoms to assume positions that maximize interactions. Any gel-enhancing agent containing material is selected in order that it does not substantially interfere with the gelling properties of agar but actually enhances such properties. In preferred embodiments of the invention, the gel-enhancing agent employed in the practice of the invention is a polymer having nitrogen containing groups in the monomeric units. Preferably, the gel-enhancing agent polymer is a poly(amine) wherein the polymer is formed from one or more monomers with available primary or secondary amine groups. It is believed that amine groups react with carbonyl groups of the agar to form a Schiff Base linkage resulting in crosslinking of the agar. In additionally preferred embodiments, the gel-enhancing agent is a polyalkylene amine. In other preferred embodiments, the gel-enhancing agent is a polyalkyleneimine. In particular preferred embodiments, the alkylene repeating group of the polyalkeneimine has 1 to 8 carbons. In more particular preferred embodiments, the alkylene of the polyalkyleneimine has 2 to 5 carbons. In the most preferred embodiment, the gel-enhancing agent is a polyethyleneimine.

The molecular weight of the polyethyleneimine can vary substantially. Preferably, the molecular weight ranges from about 500 to about 100,000. In more preferred embodiments, the molecular weight ranges from about 1,000 to about 80,000. In further preferred embodiments, the polyethyleneimine has a molecular weight ranging from about 1,000 to about 75,000.

Illustrative of polyethyleneimines employed in practice of the invention are those polyethyleneimines commercially available from Kodak, Polysciences, Sigma, Aldrich, Arsynco, Hoeschst-Celanege, BASF, Dow Chemical and Aceto Chemical.

To the above ingredients of a gel-forming composition, a solvent for the gel-forming material is added. Any solvent which will dissolve the gel-forming composition and allow gelation to occur is suitable. For agar, water is often used as a solvent since it is also inexpensive. Other solvents for use in the practice of the invention are mixtures of water and alcohols, for example, methanol, ethenol, propanol and butanol.

In additional embodiments of the invention, the agar gel-forming composition further comprises an oxidizing agent. The oxidizing agent oxidizes sugar moieties of the agar material to carbonyl groups, and the carbonyl groups are then available to react with available primary or secondary amine groups, forming a Schiff base discussed as above. The oxidizing agent can be reacted with agar prior to adding a gel-enhancing agent or both can be added simultaneously.

Suitable oxidizing agents include periodic acid and its salts, e.g. $NaIO_4$, hypohalites (e.g. NaOCL), persulfates (e.g. $(NH_4)_2 S_2O_8$); chromium (IV) compounds (e.g. $CrO_3$, $K_2Cr_2O_4$; $KMNO_4$; peracids (e.g. $CH_3C(o)OOH$) and hydrogen peroxide as well as other similar oxidizing agents. Generally, group IA and group IIA metal salts can be employed an oxidizing agents. In preferred embodiments, the oxidizing agent is a periodate ion. In further preferred embodiments, the oxidizing agent is a group IA or group IIA metal salt of periodate, with the most preferred embodiment employing a sodium salt of a periodate. The periodate anion is especially beneficial because of its ability to selectively oxidize adjacent hydroxyl groups to the corresponding dialdehyde. Any oxidizing agent capable of oxidizing adjacent hydroxyl groups to the dialdelyde form is an "effective oxidizing agent" for the practice of this invention.

In the molding compositions of this invention, the powders generally comprise about 50 to about 95 percent by weight of the composition. Preferably, the powders constitute between about 75 and about 90 percent by weight of the compositon, and most preferably, about 80 to about 90 percent by weight of the composition. The gel-forming material comprises about 0.5 to about 16 percent by weight of the molding composition with the remainder of the molding composition being solvent. Preferably, the gel-forming material constitutes from about 0.75 to about 4 percent, and most preferably from about 1 to 3 percent.

The amount of gel-enhancing agent employed is generally at least about 0.05 percent by weight of gel-forming material. Preferably, the amount of gel-enhancing agent ranges from about 0.05 to about 10.0 percent by weight of gel-forming material. More preferably, the amount of gel-enhancing agent ranges from about 0.05 to 5%, and the most preferred amount ranges from about 0.1 to about 3.0 percent.

The amount of oxidizing agent employed will vary with the selection of gel-forming material and gel-enhancing agent. Generally, the amount of oxidizing agent employed is at least about 0.002 percent by weight of gel-forming material. Preferably, the amount of oxidizing agent ranges from about 0.005 percent to 0.20 percent. More preferably, the amount of oxidizing agent ranges from about 0.015 to about 0.05 percent with the most prefered amount of oxidizing agent ranging from about 0.01 percent to about 0.03 percent.

Once the solvent is added to the gel-forming composition, a molding composition can be prepared directly by adding the material to be molded. The molding composition of the invention comprises gel-forming material; a gel-enhancing agent; one or more powders selected from ceramics and metal powder or a mixture thereof, and a solvent for the agar. A precursor molding composition comprises an agar gel-forming material, a gel-enhancing agent and one or more powders selected from ceramic and metal powders or mixtures thereof.

By subjecting the molding composition to a gelation treatment, the molding composition forms a self-supporting preform article, which can be sintered or fired. From the molding compositions the self-supporting preform articles (or green bodies) of the invention are formed by the following steps:

a) heating a mixture of
1. a gel-forming material,
2. a gel enhancing agent,
3. a gel-forming material solvent,
4. one or more ceramic or metal powders, and
5. optionally, an oxidizing agent to a first temperature above the gel point of the gel-forming composition to solubilize the gel-forming material;

b) placing the mixture in a molding device; and c) molding the mixture at a second temperature, cooler than said first temperature at or below the gel point of the gel-forming material to produce a self-supporting article comprising the powders in a gel. In alternative embodiments, the mixture is heated once placed in the mold.

In forming the self-supporting (preform) article, the components may be added together or sequentially in any order. The order of adding of the components (1-5) may depend on the properties and characteristics of the components. In general, if an oxidizing agent is employed, the oxidizing agent is added to the gel-forming agent before, during or after the solvent is added. Preferably, the gel-forming material is sufficiently dissolved when the oxidizing agent is added to the gel-forming material (it is sufficiently dissolved when the mixture appears substantially or completely transparent). A gel-enhancing agent is added after the oxidation reaction is completed in order that the gel-enhancing agent is allowed to react with available oxidized molecules of the gel-forming material. If an oxidizing agent is not employed, the gel-enhancing agent can be added to the gel-forming material before, during, or after the solvent is added. The ceramic or metal powder is generally added after the gel-enhancing agent. The temperature of the molding composition is maintained above the gel point of the mixture until all components are added. In alternative embodiments, it may be beneficial to begin to lower the temperature of the molding composition prior to adding the ceramic or metal powder; however, in this case the ceramic is still added to the mixture prior to reaching the gelation temperature of the mixture.

When the components are added, specifically a gel-enhancing agent such as polyethyleneimine, the gel-forming material, e.g. agar, is maintained at an elevated temperature. Preferably, the gel-forming material is maintained at a temperature of at least about 70° C. In more preferred embodiments, the temperature is at least about 80° C. In particularly preferred embodiments, the temperature is at least about 90° C., with a temperature ranging from about 90° C. to about 100° C. being the most preferred.

The gel-forming material is maintained at an elevated temperature for an effective length of time. An "effective" length of time is sufficient to allow the gel-forming material to dissolve completely (or substantially) in the solvent. Generally, the gel-forming material is maintained at an elevated temperature for several minutes, preferably, at least about 5 minutes. More preferably, the effective length of time is at least about 10 minutes. In particularly preferred embodiments, the effective length of time is at least about 20 minutes. In the most preferred embodiments, the effective length of time is at least about 30 minutes.

The gel-enhancing agent is added to the gel-forming material immediately after the gel-forming material begins to boil. Generally, the gel-enhancing agent is added once the gel-forming temperature reaches a temperature between about 70° C. and 100° C. An optimal gel strength is obtained when the temperature of the gel-forming material is about 90° C. to about 100° C. and the gel-enhancing agent itself is at room temperature (approximately 20° to 25° C.).

It should be noted that the temperature of the gel-enhancing agent, when added, can be varied. Generally, the gel-enhancing agent is at room temperature when added. In a preferred embodiment, the gel-enhancing agent, such as polyethyleneimine, is added to the gel-forming material or molding composition at a temperature above room temperature.

Other embodiments of the present invention are directed to preparing self-supporting (preform) articles by injection molding of molding compositions. An injection molding process for forming a self-supporting (preform) article comprises the following steps:

a) injecting a mixture of
1. powders selected from ceramic and metal powders or mixtures thereof.
2. a gel-forming material,
3. a solvent,
4. a gel-enhancing agent, and
5. a carrier;

into a mold, the mixture being maintained prior to the injection step at a first temperature above the gel point of the gel-forming material.

b) cooling the mixture in the mold to a second temperature below the gel point of the gel-forming material to form a self-supporting article. Preferably first temperature ranges from 80 C to 100 C; and, said second temperature ranges from 15° C. to 30° C.

An alternative injection molding process comprises adding an oxidizing agent to the mixture in step (a) as well as adding the components in step (a) sequentially in any order or all at once. Preferences for the order of addition of components in step (a) of the injection molding process substantially follow the guidelines set forth above.

For injection molding, the gel-forming composition is proportioned with a carrier to be fluid enough to enable it to be readily supplied to a die. The carrier/gel-forming composition mixture can be supplied to a die by conventional means in addition to injection molding processes. Of course, the carrier must not substantially interfere with the gelation of the agar composition.

The liquid carrier is normally added to the mixture to produce a homogeneous mixture of the viscosity necessary to make the mixture amenable to being molded by the desired injection molding process. Ordinarily, the liquid carrier is added in an amount that is necessary to produce a homogeneous mixture and to insure the proper fluidity of the mixture. Generally, the amount of a liquid carrier is an amount between about 10 percent to about 40 percent by weight of the mixture depending upon the desired viscosity thereof less the amount of solvent employed to dissolve the gel-forming material. In the case of water, which performs the dual function of being a solvent and a carrier for agar containing mixtures, the amount is simply between about 10 percent an about 40 percent by weight of the mixture, with amounts between about 15 percent and about 30 percent by weight being preferred.

The compositions of this invention may also contain a variety of additives which can serve any number of useful purposes. For example, dispersants may be employed to ensure a more homogeneous mixture. Lubricants such as glycerine may be added to assist in feeding the mixture along the bore of an extruder barrel and additives such as glycerine to reduce the vapor pressure of the liquid carrier and enhance the protection of the neat net shape objects. The amount of additives will vary depending on the additive and its function within the system. However, the additives must be controlled to ensure that the gel strength of the gel-forming material is not substantially destroyed.

The compositions are supplied to the mold by any of a variety of well known techniques including gravity feed systems, and neumatic or mechanical injection systems. Injection molding is the most preferred technique because of the fluidity and low processing temperatures of the mixtures.

A very wide range of molding pressures may be employed. Generally, the molding pressure is between about 20 psi and about 3,500 psi, although higher or lower pressures may be employed depending upon the molding technique used. Most preferably, the molding pressure is in the range of about 40 psi to about 700 psi. An advantage of the present invention is the ability to mold the novel compositions using low pressures.

The molding temperature must, of course, be at or below the gel point of the gel-forming material in order to produce a self-supporting body. The appropriate mold temperature can be achieved before, during or after the mixture is supplied to the mold. Ordinarily, the mold temperature is maintained at less than about 25° C., and preferably is between about 15° C. and about 20° C. Thus, for example, it is expected that optimum production rates would be achieved with an injection molding process wherein the preferred gel-forming materials (which exhibit gel points between about 30° C. and about 45° C.) are employed to form a mixture maintained at about 90° C. or less, and wherein the mixture is injected into a mold maintained at about 25° C. or less. FIG. 1 schematically illustrates one embodiment of such a process.

After the part is molded and cooled to a temperature below the gel point of the gel forming material, the green body is removed from the mold. The green body, being a self supporting body, requires no special handling during removal from the mold or during placement into the furnace. The green body is then placed directly into the furnace after being removed from the mold and dried.

In the furnace, the body is fired to produce the final product. The firing times and temperatures (firing schedules) are regulated according to the powdered material employed to form the part. Firing schedules are well known in the art for a multitude of materials and need not be described herein. Because of the use of the novel molding composition of the present invention, no supporting materials are required during firing. Ordinarily for wax based systems, an absorbant, supporting powder is employed to assist in removing the wax from the part and to aid in supporting the part so that the intended shape of the product is maintained during firing. The present invention eliminates the need for such materials.

The following examples are provided to illustrate some embodiments of the invention. The examples, however, are not intended to limit the scope of the invention to anything less than that which is set forth in the claims.

Gel strength is measured by using a method referred to as the Punch Test Method. The apparatus consists of a rod having a circular cross sectional area (1.26 cm¹I actual area of rod) at one end thereof which is suspended above one pan of a double beam, two pan balance. Initially, a large container is placed on each pan of the double beam balance. The container placed on the pan, above which is suspended the rod is filled with about 200 ml of a gel consisting of the gel-forming material and water. The empty container is then balanced against the gel-containing container. The rod is then lowered into contact with the top surface of the gel. Water is then metered into the empty container and the position of the balance pointer is continuously monitored. When the top surface of the gel is punctured by the rod, the balance pointer rapidly deflects across the scale and the water feed is immediately discontinued. The mass of water in the container is then measured and the gel strength, mass per unit area is calculated.

EXAMPLE 1

Various components were added to a 1.5% agar solution to determine suitable gel-enhancing agents. Into 100 ml of the 1.5% (wt/v) agar solution, the following components were added. The solution was allowed to cool and gel at room temperature for equal amounts of time. The Punch Test Method was then employed to measure gel strength. The results are summarized in Table 1.

TABLE 1

| Component (g/cm²) | Composition (% wt/v) | Gel Strength |
|---|---|---|
| Calcium (CaCl₂) | .6 | 498 |
| Potassium (KCl) | .5 | 492 |
| Glucosamine (6% solution in Glacial Acetic Acid) | .8 | 593 |
| Polyethyleneimine (30% aqueous solution) | .3 | 830 |
| Locust Bean Gum | .3 | 622 |
| Clarifloc C-310 (32% aqueous solution) | 1.0 | 368 |
| Control (agar w/o additive) | | 535 |

Polyethyleneimine used in Examples 1–4 was Corcat 145 purchased from Cardova Chemicals. The PEI/Corcat products are presently available from Hoechst-Celanese.
wt/v is the weight in grams of component added to the 100 ml 1.5 agar solutions.
Clarifloc C-310 is a cationic polyacrylamide flocculant, commercially available from Polypure, Inc. of Parsippany, New Jersey (Polypure is a division of Rohn-Poulenc).

EXAMPLE 2

The effect of the concentration of a gel-enhancing agent was determined by varying the concentration of polyethyleneimine in a 1.5% (wt/v) agar solution. In 100 ml of 1.5% (wt/v) agar solution, appropriate variations in the concentration of polyethyleneimine were made. The resulting solution were allowed to cool and gel at room temperature for equal amounts of time. The Punch Test Method was employed to measure gel strength of each respective solution. The results are summarized in Table 2.

TABLE 2

| Concentration of Polyethyleneimine (% wt/v) | Gel Strength (g/cm²) |
|---|---|
| .03 | 640 |
| .06 | 726 |
| .09 | 750 |
| .12 | 760 |
| .15 | 770 |
| .18 | 761 |
| .24 | 903 |
| .30 | 976 |
| .45 | 912 |
| .60 | 765 |
| .75 | 648 |

EXAMPLE 3

The effect that temperature of the polyethyleneimine addition has on the resulting gel strength was evaluated. Into 100 ml of prepared 1.5% (wt/v) agar solution, 1.0 g of polyethyleneimine was added and the solution allowed to boil for five minutes. Into a second 100 ml of boiling 1.5% (wt/v) agar solution, 1.0 g of polyethyleneimine was added with no further boiling. To a third 100 ml of boiling 1.5% (wt/v) agar solution no polyethyleneimine was added and served as Control. All three preparations were allowed to cool and gel at room temperature for equal amounts of time. The Punch Test Method was used to measure gel strength. Table 3 summarizes the temperature dependence results.

TABLE 3

| Preparation | Approx. Temperature of Added Polyethyleneimine | Gel Strength (g/cm²) |
|---|---|---|
| 1 | 95 C.–100 C. | 863 |
| 2 | 75 C. | 1158 |
| 3 | Control-no PEI added | 607 |

EXAMPLE 4

The effect that concentration of an oxidizing agent has on gel strength was measured. The concentration of sodium periodate in a boiling 1.5% (wt/v) agar solution was varied. Various amounts of sodium periodate were added to 100 ml of a boiling 1.5% (wt/v) agar solution after a twenty-five minute boiling time and allowed to continue boiling five minutes further. To each 100 ml of agar solution, 1.0 g of polyethyleneimine solution was added and thoroughly mixed. All preparations were allowed to cool and gel at room temperature for equal amounts of time. The Punch Test Method was employed to measure gel strength. Table 4 summarizes the results of the effect of concentration of an oxidizing agent.

TABLE 4

| Concentration of NaIO₄ (% wt/v) | Gel Strength (g/cm²) |
|---|---|
| .20 | 352 |
| .10 | 590 |
| .06 | 838 |
| .03 | 894 |
| .02 | 959 |
| .01 | 900 |

We claim:

1. A molding composition comprising powders selected from the group consisting of metal powders, ceramic powders and mixtures thereof, a gel-forming polysaccharide material, a gel-enhancing agent capable of reacting with said gel-forming material, and an oxidizing agent capable of oxidizing said gel-forming material, wherein said gel-enhancing agent is a polymer having nitrogen containing groups.

2. A composition according to claim 1 wherein said gel-forming material is agar.

3. A composition of claim 1 which further comprises a solvent for gel-forming material.

4. The composition of claim 1 wherein said gel-enhancing agent is a poly(amine).

5. The composition of claim 4 further comprising an oxidizing agent.

6. The composition of claim 5 wherein the oxidizing agent is a periodate acid or metal salt thereof.

7. The composition of claim 1 wherein said oxidizing agent is a periodate acid or metal salt thereof.

8. An injection molding process comprising the steps of
    a) injecting a mixture comprising
        (1) powders selected from the group consisting of metal powders, ceramic powders and mixtures thereof,
        (2) a gel-forming polysaccharide material,
        (3) a gel-enhancing agent capable of reacting with said gel-forming material,
        (4) a gel-forming material solvent, and
        (5) an oxidizing agent capable of oxidizing said gel-forming material;
    into a mold, the mixture being maintained prior to the injection step at a first temperature above the gel point of the gel-forming material, said temperature being in the range from about 70° C. to about 100° C.; and
    b) cooling the mixture in the mold to a second temperature below the gel point of the gel-forming material to form a self supporting article, wherein said gel-enhancing agent is a polymer having nitrogen containing groups.

9. Article of manufacture produced by heating the product formed by the method of claim 8.

* * * * *